July 21, 1942.    C. F. ENGELHARDT    2,290,321
PISTON RING
Filed Oct. 21, 1940    2 Sheets-Sheet 2
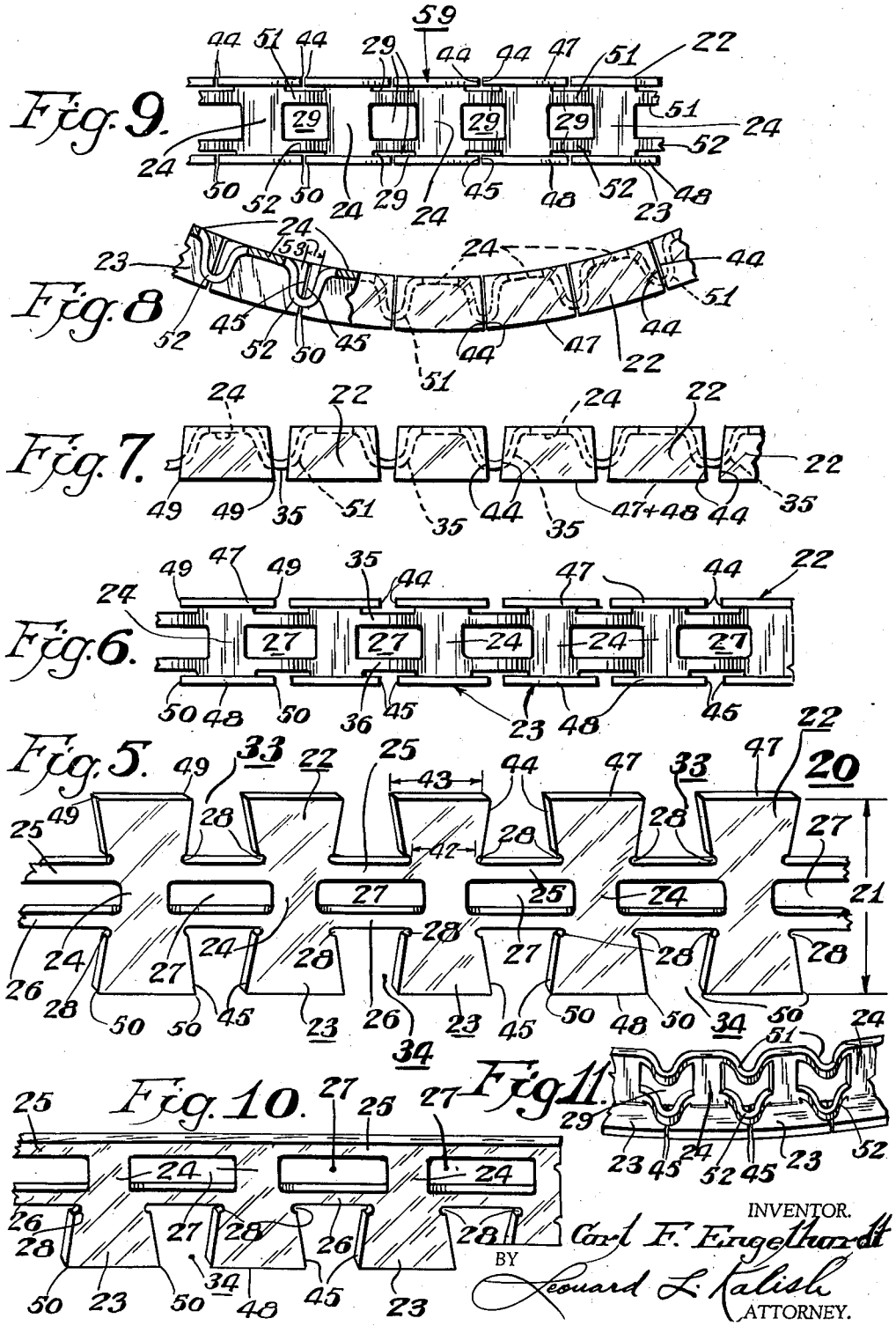
INVENTOR.
Carl F. Engelhardt
BY Leonard L. Kalish
ATTORNEY.

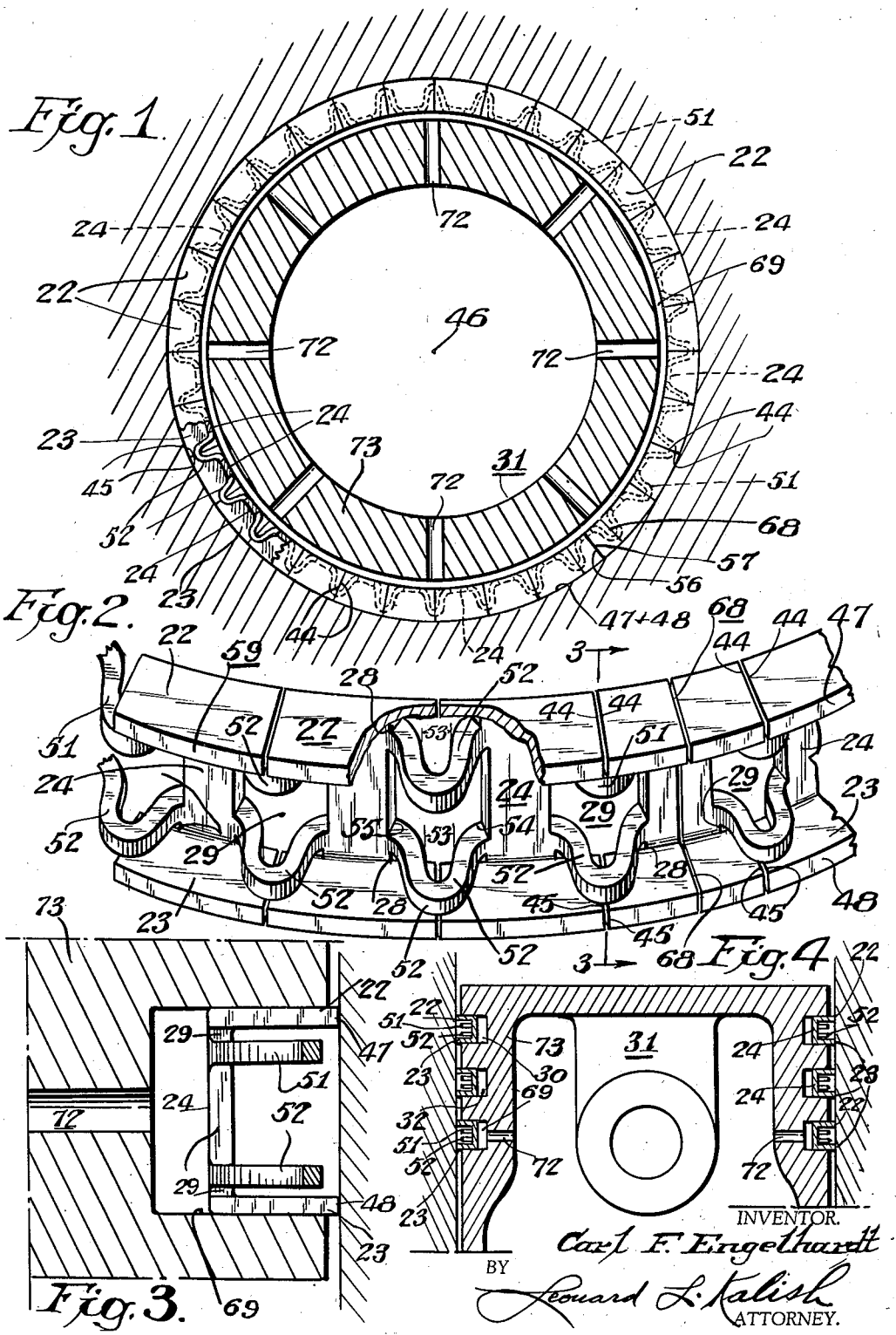

Patented July 21, 1942

2,290,321

UNITED STATES PATENT OFFICE 2,290,321

PISTON RING

Carl F. Engelhardt, Yeadon, Pa., assignor to Wilkening Manufacturing Company, Philadelphia, Pa., a corporation of Delaware Application October 21, 1940, Serial No. 362,117

6 Claims. (Cl. 309—45)

The present invention relates to a self-expanding piston ring and it relates more particularly to a self-expanding piston ring which is preferably made of sheet metal, and so formed, constructed, and arranged as to present two relatively narrow parallel annular cylinder-contacting sealing surfaces composed of a multiplicity of sector-like sections disposed end to end in close proximity to each other so as to constitute more or less continuous annular cylinder-contacting surfaces with but a very small gap between the sectors, and spring means forming an integral part of the piston ring and also preferably formed of the same sheet metal of which the cylinder-contacting elements are formed, thereby to tend to expand the ring tangentially or circumferentially with a resultant radially outward expansion of the component cylinder-contacting elements thereof.

The present invention is a modification and improvement of the construction disclosed in applicant's co-pending application Serial No. 321,200, filed February 28, 1940.

The piston ring of the present invention may be used both for oil control purposes in the bottom ring-receiving groove of a piston which has apertures through the piston wall for oil drainage and which may also be used in the upper ring-receiving grooves without any oil drain holes through the piston wall, for compression purposes.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings in which like reference characters indicate like parts, Figure 1 represents a top plan view of a piston ring embodying the present invention as shown installed in a piston disposed within a cylinder, which is generally on line 1—1 of Figure 3, (the parts not being in true proportion, for purposes of better illustration).

Figure 2 is a perspective view of a fragmentary portion of the piston ring of the present invention on a much enlarged scale with a portion broken away better to expose to view some of the internal details of construction.

Figure 3 represents a section on line 3—3 of Figure 2.

Figure 4 represents a sectional view of the upper portion of a piston showing the piston ring of the present invention disposed in each of the three ring-receiving grooves thereof.

Figure 5 represents a perspective view of a fragmentary portion of a sheet metal blank in its flat condition of which the piston ring of the present invention may be formed, but before the cylinder-contacting elements 22 and 23 have been bent over and before the spring-forming elements 25 and 26 thereof have been formed or shaped into the springs 51 and 52 intervening the cylinder-contacting elements 22 and 23.

Figures 6 and 7 represent a front view and a top elevational view, respectively, of a fragmentary portion of a strip of piston ring material like that shown in Figure 5, but after the cylinder-contacting elements 22 and 23 have been bent over and after the intervening spring-forming portions 25 and 26 have been formed into the generally U-shaped springs 51 and 52, but before the strip has been completely formed into the arcuate formation by the further collapsing of the U-shaped spring members 51 and 52.

Figures 8 and 9 represent a front elevational view and a top plan view, respectively, similar to that shown in Figures 6 and 7, but after the strip had been formed into generally arcuate form corresponding generally to the curvature of the cylinder in which the piston ring is to be used, by further collapsing the generally U-shaped spring members 51 and 52 and by bringing the juxtaposed radial edges 44 and 45 of the cylinder-contacting elements 22 and 23 into close proximity to each other.

Figure 10 represents a perspective view similar to that of Figure 5 of a sheet metal blank having only single cylinder-contacting elements 23.

Figure 11 represents a perspective view similar to that of Figure 2 of the embodiment indicated in Figure 10.

One form or embodiment of the present invention is illustrated in Figures 1 to 9 inclusive, the formation of which is illustrated in Figures 5 to 9 inclusive.

Thus, in this embodiment of the present invention, a flat sheet-metal strip 20 of suitable thickness having an aggregate width 21, is cut out in the general manner indicated in Figure 5, to form juxtaposed upper and lower generally sector-shaped cylinder-contacting elements 22 and 23 with intervening connecting spacer portions 24 and with spring-forming portions 25 and 26.

As shown in Figure 5, a flat sheet-metal strip 20 of suitable thickness having an aggregate width 21 is cut out to form juxtaposed, upper and lower, generally sector-shaped, cylinder-contacting, elements 22 and 23 with intervening spacer portions 24 and with spring-forming portions 25 and 26. The spring forming portions 25 and 26 are relatively narrow with an opening 27 formed intermediate thereof and with notches 28 cut out at the ends of said spring-forming elements 25 and 26 to form indentations in the cylinder contacting elements 22 and 23. This structure provides openings 29 in the radially inner wall of the piston ring after it is finally formed, such openings being advantageous when the piston ring is used for oil-control purposes in one or two of the lower ring-receiving grooves 69 of a three-groove piston such as is illustrated in Figure 4, or of a four-groove piston wherein the lowermost or the lower two ring-receiving grooves are provided with oil drain holes 72 extending through the piston wall 73 for oil drainage purposes. The piston ring may be used unchanged for compression purposes in the uppermost ring-receiving groove 30 of the piston 31 or in the upper two ring-receiving grooves 30 and 32, as shown in Figure 4.

The longitudinal or circumferential width of the cylinder-contacting portions 22 and 23 is slightly smaller in the base dimension 42 than in the end dimension 43 or in the peripheral dimension 43, this difference being so calculated that when the cylinder-contacting elements 22 and 23 have been bent over and have been brought generally edge-to-edge, as indicated in Figures 1, 2 and 9, the juxtaposed edges 44 and 45 will parallel each other and will be disposed as radii in relation to the axis or center 46 of the piston.

The peripheral or cylinder-contacting edges or surfaces 47 and 48 of the cylinder-contacting elements 22 and 23, respectively, may also be given a slight convex arcuate curvature between the ends 49 and 50 thereof corresponding to the curvature of the cylinder in which the piston ring is intended to be used, so that when the cylinder-contacting elements 22 and 23 are placed side by side in close proximity as indicated in Figures 1, 2 and 9, the successive adjacent cylinder-contacting surfaces 47 and 48, respectively, will form corresponding true circles matching the circle of the cylinder.

The formation of the blanks shown in Figure 5 may be accomplished by punching operations on any suitable punch press, either manual or semi-automatic or fully automatic, with suitable dies and punches either by step-by-step or progressive punching operations. However, if desired, the blanks shown in Figure 5 may also be formed by milling out the portions 33 and 34 or by cutting out the portions 33 and 34 on a shaper or on a broaching machine. If the portions 33 and 34 are to be cut out on a milling machine or on a shaper or on a broaching machine, several sets may be stacked together and may be milled, shaped or broached all together, gangwise.

The piston ring is formed by bending over towards each other the juxtaposed cylinder-contacting elements 22 and 23 so that they more or less parallel each other as indicated in Figures 6, 7, 8 and 9 and also in Figure 2, and by corrugating or bending the spring-forming elements 25 and 26 in a generally radial direction to form a series of spaced corrugation-like or loop-like double springs 51 and 52.

The formation of the piston ring from the blank shown in Figure 5 may be accomplished by successive bending operations performed in any suitable sequence or all the bending operations may be done more or less simultaneously to produce the result indicated in Figures 8, 9, 1 and 2. In Figures 6, 7, 8 and 9, however, I have illustrated what may be one desirable sequence of bending or forming operations although it is to be understood that this sequence may be changed, or the bending or forming operations may all be accomplished more or less simultaneously by suitable automatic or semi-automatic bending and forming jigs or fixtures or machines.

Thus, for instance, in Figures 6 and 7, I have illustrated what may be an initial stage in the formation of the piston ring wherein the cylinder-contacting elements 22 and 23 have been bent over to parallel each other and wherein the spring-forming portions 25 and 26 have been bent into initial U-shape formations 35 and 36 preliminary to their formation into the more closed loop-shaped springs 51 and 52 shown in Figures 8 and 9. In this condition, the piston ring forming strip would be generally straight as indicated particularly in Figure 7, with the juxtaposed edges 44 and 45 substantially separated from each other and in non-parallel relation. Thereafter, the generally U-shaped formations 35 and 36 may be collapsed somewhat to form the more or less loop-like springs 51 and 52 with a relatively smaller gap 53 between their free ends 54 and 55;—the gap 53 being sufficient, however, so that the ends 54 and 55 will not quite touch each other when the juxtaposed radial edges 44 and 45 of the cylinder-contacting elements 22 and 23 have actually contacted each other. By this final collapsing operation the piston ring material or strip is formed into a generally arcuate shape indicated in Figure 9 generally corresponding to the curvature of the cylinder in which the piston ring is to be used.

In the commercial manufacture of piston rings according to the present invention, the blank shown in Figure 5 as well as the corresponding piston ring strips shown in Figures 6, 7, 8 and 9 may be formed more or less continuously in relatively great lengths from which smaller pieces may then be cut off after the strip has been compeltely formed or shaped into the form shown in Figures 6 and 7, or even after it has been formed into the curved shape shown in Figures 8 and 9. The length of the individual pieces would correspond more or less accurately to the circumferential dimension of the piston ring desired. For the different size piston rings the other dimensions would also be varied to accord with the width of the ring-receiving groove, the depth of the ring-receiving groove, and diameter of the piston.

Thus, for instance, the individual pieces corresponding to the circumferential length of the piston ring could be cut off while the strip is straight as in Figures 6 and 7 and then the shorter piece curved and completed to the form shown in Figures 8 and 9 and in Figures 6 and 7, or the strip can be curved while it is still part of the whole piece of considerable length and formed into a generally spiral formation as it is being curved and thereafter individual pieces cut off corresponding to the circumferential length of the piston ring so that each piece will be one complete circle of the desired diameter.

In making the piston ring, the springs 51 and 52 are collapsed until the juxtaposed edges 44 meet each other or abut each other and until the edges 45 likewise meet and abut each other, thereby producing the curved shape. However, when the compression pressure is released the springs 51 and 52 open up slightly or spring back slightly so that the edges 44 and 45 separate from each other slightly as indicated in Figures 2, 8 and 9. However, the circumferential length of the piston ring is so adjusted that when the free ends 56 and 57 of the piston ring abut each other and the ring is compressed circumferentially or tangentially into the diameter of the cylinder 58, the radial edges 44 and 45 of the cylinder-contacting elements 22 and 23, respectively, will generally abut each other or will have but a very small clearance between them. It is estimated that the total or aggregate of all clearances between the successive pairs of edges 44 in the entire circumference or between the successive pairs of eges 45 in the entire circumference may be a few thousandths of an inch, perhaps .003" to .007", more or less (that is, an amount perhaps no greater than the clearance at the gap in an ordinary piston ring);—it being understood that at the gap or break 68 there would be substantially no clearance as the edges 56 and 57 will abut each other. Thus, by reason of the fact that each of the bends or springs 51 and 52 tends to open up slightly when the ring is compressed into the cylinder as is indicated in Figure 1, there is a uniformly distributed tangential or circumferential force between successive sections of the piston ring, that is, between successive or adjacent cylinder-contacting elements 22 and 23, respectively, and this force is in turn translated into an outward radial component force tending to press the cylinder-contacting elements 22 and 23, or tending to press the cylinder-contacting edges 47 and 48 thereof, into contact with the cylinder wall with a uniformly distributed and predetermined radial force.

The cylinder-contacting elements 22 and 23 are preferably (though not necessarily) staggered slightly or offset slightly in relation to each other as indicated particularly in Figures 5, 6, 7, 8 and 9, so that the edges 44 and edges 45 are not directly in alignment with each other but are slightly offset in relation to each other, thereby tending to minimize even any tendency to "blowby." If desired, this staggering may be more accentuated than that shown in the drawings.

In the manufacture of the piston ring of the present invention, I may also grind-finish the cylindrical periphery 59 of the completed ring by clamping the finished ring axially between suitable supporting discs upon a suitable mandrel or any suitable fixture, while the ring is generally fully compressed, and then grinding the periphery 59 to match the cylinder, by rotating the ring about its axis against a revolving grinding wheel. If desired, a number of piston rings may be so clamped and held side by side on the same fixture or on the same mandrel between the same clamping discs or blades, so that they may be ground all together to match the cylinder.

The gap or break 68 in the piston ring may be formed through the pair of juxtaposed cylinder-contacting elements 22 and 23 as indicated in Figures 1 and 2.

The piston ring of the present invention is highly effective both for oil-control as well as for compression, and may be used without any separate expander spring and will produce a suitably high cylinder-contact pressure per unit of area between the cylinder-contacting surfaces of the piston ring and the cylinder wall.

The piston ring of the present invention is preferably made of sheet steel of suitable consistency or suitable hardness although it may be made of other sheet metals, such as sheet bronze or sheet brass or other suitable alloys, both ferrous and non-ferrous. If the piston ring is made out of sheet steel, it may be formed out of fully annealed sheet steel but one capable of being subsequently hardened and tempered to a suitable degree of hardness and also to impart a suitable degree of resiliency to the spring members 51 and 52. Thus, for instance, the blank shown in Figure 5 may be formed while the metal is completely annealed and the formation shown in Figures 6 and 7 and even the formation shown in Figures 8 and 9 may be made while the metal is fully annealed, although these formations may also be formed with a certain amount of hardness set into the metal by suitable hardening and tempering. The final hardening and tempering, however, should preferably be done before the cylinder-contacting circumference of the completed ring is grind-finished or otherwise finished to the cylinder diameter.

The piston ring of the present invention exerts a relatively weak radially-outward, spring-like action due to the fact that the spring members 51 and 52 are comparatively thin and resiliently weak. As a result, the tendency toward scoring of the cylinder wall due to excessive pressure by the piston rings is minimized and the piston rings of the present invention in sizes ranging from standard to .060 oversize in diameter have very little difference in pressure exerted.

The piston ring of the present invention also provides increased oil drainage by reason of the fact that there is available a greater area of opening in the back or radially-innermost wall of the piston ring. As shown in Figure 8, these oil drainage openings 29 extend the entire axial width of said back wall beneath each pair of spring members 51 and 52.

It is possible to make one of the cylinder-contacting elements 22 or 23 shorter than the other so that it does not, in the finished piston ring, actually make contact with the cylinder wall. It is possible also to completely omit one of the cylinder-contacting elements 22 or 23 so that the finished ring will consist of a single, narrow cylinder-contacting surface and a corrugated spring-like, supporting and spacing member as shown in Figures 10 and 11.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A flexible, one-piece self-expanding piston ring formed from a strip of resilient sheet material and comprising a series of circumferentially arranged sections, U-shape in radial cross-section and providing open fronts, solid top and bottom walls, and a back wall, said back wall having a smaller circumferential dimension than said side walls and forming an opening in the inner peripheral edge of said piston ring between each pair of adjacent sections and twin, relatively thin spring loops integrally connecting the side edges of adjacent back walls, said loops being substantially separated axially of the ring to provide oil passages therebetween, said loops extending radially between the top and bottom walls of said U-shaped sections and short of the outer periphery of said ring, said piston ring having a circumferential dimension so proportioned to the cylinder diameter that it will be compressed to some extent when the piston ring is confined to such cylinder dimension whereby said spring loops will tend to urge each of said sections radially outward.

2. A flexible, one-piece self-expanding piston ring formed from a strip of resilient sheet material and comprising a series of circumferentially arranged sections, U-shape in radial cross-section and providing open fronts, solid top and bottom walls, and a back wall, said back wall having a smaller circumferential dimension than said side walls and forming an opening in the inner peripheral edge of said piston ring between each pair of adjacent sections and twin, relatively thin spring loops integrally connecting the side edges of adjacent back walls, said loops being substantially separated axially of the ring to provide oil passages therebetween, said loops extending radially between the top and bottom walls of said U-shaped sections and short of the outer periphery of said ring, said top and bottom walls forming a pair of segmented, annular, cylinder-contacting ribs, said ribs having a circumferential dimension so proportioned to the cylinder diameter that they will be compressed to some extent when confined to such cylinder dimension.

3. A flexible, one-piece self-expanding piston ring formed from a strip of resilient sheet material and comprising a series of circumferentially arranged sections, U-shape in radial cross-section and providing open fronts, solid top and bottom walls, and a back wall, said back wall having an oil-drain opening in the inner peripheral edge of said piston ring and twin, relatively thin spring loops integrally connecting the side edges of adjacent back walls, said loops being substantially separated axially of the ring to provide oil passages therebetween, said loops extending radially between the top and bottom walls of said U-shaped sections and short of the outer periphery of said ring, said top and bottom walls forming a pair of segmented, annular, cylinder-contacting ribs, said ribs having a circumferential dimension so proportioned to the cylinder diameter that they will be compressed to some extent when confined to such cylinder dimension whereby said spring loops will tend to urge each of the segments of said ribs radially outward.

4. A flexible one-piece, self-expanding piston ring comprising a series of circumferentially arranged generally adjacent sections, each including a side wall and a back panel formed integrally therewith, said back panel having a smaller circumferential dimension than said side wall and forming an opening in the inner peripheral edge of said piston ring between each pair of adjacent sections, a plurality of relatively narrow looped spring members connecting successive pairs of adjacent sections, said spring members being formed integrally with and in continuation of said back panels, said spring members being substantially separated axially of the ring to provide oil passages therebetween, said spring members being bent in a radially outwardly direction from said back panels and generally spanning the openings in the inner peripheral edge of said piston ring, said side walls forming an annular, cylinder-contacting rib.

5. A one-piece, flexible, self-expanding piston ring comprising a central corrugated annulus composed of alternating crests and troughs extending in a generally radial direction, said crests being radially outermost, said crests being formed of a plurality of relatively narrow, axially separated spring members, said spring members being substantially separated axially of the ring to provide oil passages therebetween, a pair of more or less parallel integrally formed extensions projecting from each of said troughs radially outwardly beyond said crests, said extensions being arranged in close proximity to each other to form a pair of more or less continuous axially displaced, annular, cylinder-contacting ribs.

6. A self-expanding flexible piston ring formed of sheet metal comprising a series of generally adjacent sections each including a pair of generally parallel side walls and a back panel formed integrally therewith, together forming a generally U-shaped cross-section in a plane in which the axis of the ring lies, said side walls being circumferentially staggered with relation to each other, a plurality of relatively thin spring members connecting successive pairs of adjacent sections, said spring members being formed integrally with and in continuation of said back panels of said U-shaped sections, said spring members between each pair of sections being substantially spaced from each other axially of the ring to provide oil passages therebetween, and said back panels being narrower than said side walls in circumferential direction, and being substantially spaced from each other.

CARL F. ENGELHARDT.